3,133,112
S-CARBAMYL-L-CYSTEINE
William Shive and Charles Gordon Skinner, Jr., Austin, Tex.
No Drawing. Filed Jan. 30, 1962, Ser. No. 169,939
2 Claims. (Cl. 260—455)

This invention relates to S-carbamyl-L-crysteine.

This novel compound is prepared by reacting L-cysteine, preferably in the form of a salt such as the hydrochloride, with an alkali metal cyanate, preferably potassium cyanate, in aqueous acidic medium, such as glacial acetic acid, according to the following:

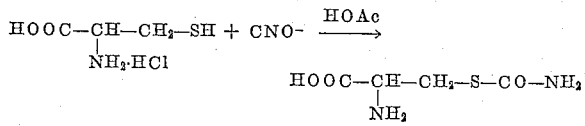

The product is recovered from the reaction mixture in any convenient manner.

The compound of this invention is useful as an antibecterial, inhibiting the growth, for example, of *Lactobacillus arabinosus*, *Streptococcus lactis*, and *Brucella abortus*. It is well known in the bacteriological art that *Streptococcus lactis* is primarily responsible for the contamination of dairy utensils and the souring of raw milk. See "Principles of Microbiology," Carter and Smith (1954), page 549, and "Microbiology, General and Applied," Sarles and Frazier (1947), page 199. A 0.1% solution of this compound in water is useful as a rinse for dairy equipment. At a concentration of 63α of the pure compound per milliliter of medium, it will completely inhibit the growth of *Brucella abortus*, the casual agent of mastitis.

These bacterial inhibitions are not prevented or reversed competitively by glutamine. Details regarding this phenomenon are set forth in "S-Carbamyl-L-Cysteine, an Inhibitory Amino Acid Analogue," by Ravel, McCord, Skinner and Shive, Journal of Biological Chemistry, vol. 232, No. 1, pages 159–168, May 1958.

The compound has also been found to have antitumor activity in mice. This is set out in "Antitumor Activity of Some Amino Acid Analogues," by Skinner, McKenna, McCord and Shive, Texas Reports on Biology and Medicine, vol. 16, No. 4, pages 493–499, Winter, 1958.

The invention will be described in greater detail in conjunction with the following specific example:

EXAMPLE

To a cooled aqueous solution containing 8.78 g. of L-cysteine hydrochloride monohydrate and 3 g. of glacial acetic acid, dissolved in 25 ml. of water, was added, in small portions with continuous stirring, a cooled solution of 8.1 g. of potassium cyanate dissolved in 20 ml. of water. The addition was completed in 30 minutes and a temperature of about 5° was maintained with external cooling. During the course of the reaction, gas evolution occurred simultaneously with each addition of potassium cyanate solution. After completion of the addition, the source of cooling was removed, and the reaction mixture was allowed to come to room temperature. After a short time, a precipitate formed. The product was transferred to a sintered glass filtering crucible and washed with a small portion of ice-cold water, containing a few drops of hydrochloric acid, followed by ethanol and finally ether. After drying in vacuo over calcium sulfate, there was recovered 5.2 g. of product, M.P. 155–160° (dec.). A paper chromatogram of this material, using the ascending technique followed by development with ninhydrin, gave an $R_f$ value in butanol-acetic acid-water (3:1:1) of 0.12, and in 85% phenol of 0.25.

*Analysis.*—Calculated for $C_4H_8N_2O_3S \cdot H_2O$: C, 26.4; H, 5.5; N, 15.4; S, 17.6. Found: C, 26.7; H, 5.3; N, 15.4; S, 17.3.

This application is a continuation-in-part of application Serial No. 859,585, filed December 15, 1959 (now abandoned), which is a continuation-in-part of application Serial No. 778,285, filed December 15, 1958 (now abandoned).

The invention claimed is:
1. S-carbamyl-L-cysteine.
2. The process of preparing S-carbamyl-L-cysteine which comprises reacting L-cysteine with an alkali metal cyanate in aqueous acetic acid at a temperature of about 5° C.

References Cited in the file of this patent

UNITED STATES PATENTS 2,060,733   Hunt et al. _____ Nov. 10, 1935
2,160,880   Loane et al. _____ June 6, 1939

OTHER REFERENCES

Lowy et al.: "Introduction to Organic Chemistry," 6th ed., pp. 213 (1945). Publisher—Appleton Century and Cross, New York.

Skinner et al.: J.A.C.S., 2412–2414, June 5, 1956, QD1–A5.

Noller: "Chemistry of Organic Compounds," 2nd ed., pp. 272 (1957), QD253–N6S.